(12) United States Patent
Tokumoto (10) Patent No.: US 9,665,720 B2
(45) Date of Patent: May 30, 2017

(54) IMAGE FORMING APPARATUS THAT PERFORMS UPDATE OF FIRMWARE, AND CONTROL METHOD THEREFOR

(71) Applicant: CANON KABUSHIKI KAISHA, Tokyo (JP)

(72) Inventor: Yoko Tokumoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 47 days.

(21) Appl. No.: 14/590,411

(22) Filed: Jan. 6, 2015

(65) Prior Publication Data

US 2015/0199518 A1 Jul. 16, 2015

(30) Foreign Application Priority Data

Jan. 10, 2014 (JP) .................................. 2014-003218

(51) Int. Cl.
*G06F 11/30* (2006.01)
*G06F 21/57* (2013.01)
*G06F 9/445* (2006.01)

(52) U.S. Cl.
CPC .............. *G06F 21/572* (2013.01); *G06F 8/65* (2013.01); *G06F 8/665* (2013.01); *G06F 2221/033* (2013.01)

(58) Field of Classification Search
CPC .......... G06F 21/572; G06F 8/665; G06F 8/65; G06F 2221/033
USPC ......................................................... 713/187
See application file for complete search history.

(56) References Cited

U.S. PATENT DOCUMENTS

| | | | |
|---|---|---|---|
| 2005/0158100 A1* | 7/2005 | Yamaguchi | G06F 8/65 400/62 |
| 2006/0265562 A1 | 11/2006 | Nishiguchi et al. | |
| 2010/0008510 A1* | 1/2010 | Zayas | G06F 21/78 380/283 |
| 2010/0083241 A1* | 4/2010 | Kobayashi | G06F 21/572 717/168 |
| 2011/0167419 A1* | 7/2011 | Ishikawa | G06F 8/65 717/171 |

(Continued)

FOREIGN PATENT DOCUMENTS

JP 2006-323675 A 11/2006

OTHER PUBLICATIONS

Hsien-Chao et al., "A smart universal remote control based on audio-visual device virtualization," Jan. 7, 2009 IEEE, pp. 172-178.*

(Continued)

*Primary Examiner* — Luu Pham
*Assistant Examiner* — Canh Le
(74) *Attorney, Agent, or Firm* — Rossi, Kimms & McDowell LLP (57) ABSTRACT

An image forming apparatus which is capable of properly updating firmware. Update firmware is downloaded into a download area of an HDD and expanded and stored in a temporary expansion area of the HDD. A CPU determines whether or not the update firmware expanded and stored in the temporary expansion area has been tampered with. The update firmware stored in the temporary storage area is applied to the image forming apparatus when the CPU determines that the update firmware has not been tampered with.

5 Claims, 10 Drawing Sheets

(56) References Cited

U.S. PATENT DOCUMENTS

2012/0124567 A1* 5/2012 Landry .................. G06F 8/665
                                                                             717/168

OTHER PUBLICATIONS

Jin-Cherng Lin et al., "Secure enhanced wireless transfer protocol," 2006 IEEE, pp. 1-8.*

* cited by examiner

IMAGE FORMING APPARATUS THAT PERFORMS UPDATE OF FIRMWARE, AND CONTROL METHOD THEREFOR

BACKGROUND OF THE INVENTION

Field of the Invention

The present invention relates to an image forming apparatus, and a control method therefor, and in particular to an image forming apparatus capable of updating firmware, and a control method therefor.

Description of the Related Art

Conventional image forming apparatuses are capable of connecting to a network and have an image storage function and a file service function of offering image data to a PC as well as an image printing function and an image sending function, and hence they have functions similar to those of computer equipment such as PCs and server equipment connecting to a network.

In PCs and server equipment, software including firmware is updated by way of a network or a medium such as a CD-ROM so as to cope with vulnerability in terms of security and malfunctions. However, in an image forming apparatus, firmware is updated after the image forming apparatus is stopped, and hence there is a time period (downtime) for which a user cannot use the image forming apparatus. The downtime compromises convenience for users and is thus desired to be reduced to the extent possible. The downtime is reduced by updating firmware in the background of an image forming apparatus or updating firmware in late night hours for which the image forming apparatus is not in use.

In particular, update of firmware in the background of an image forming apparatus is performed by "application of update firmware" in which firmware required for update (hereafter referred to as "update firmware") is downloaded and temporarily expanded in the background of the image forming apparatus during normal operation, and when the image forming apparatus is restarted, firmware that has been applied up to that time is replaced with the temporarily expanded update firmware.

In this firmware update, downloaded update firmware is encrypted to prevent application of firmware that has been, for example, tampered with. Moreover, whether or not update firmware has been tampered with is checked before the update firmware is downloaded, temporarily expanded, and applied to an image forming apparatus, and when the update firmware has been tampered with, application of the update firmware is canceled to prevent application of firmware that has been tampered with (see, for example, Japanese Laid-Open Patent Publication (Kokai) No. 2006-323675).

However, update firmware that has been downloaded and temporarily expanded stays in an image forming apparatus until it is applied to the image forming apparatus, and the longer the time period for which the update firmware stays in the image forming apparatus, the higher the possibility that the encrypted update firmware will be decrypted. This decryption may tamper with the update firmware, or even after whether or not the update firmware has been tampered with is checked, the update firmware may be tampered with. As a result, improper firmware may be applied to the image forming apparatus.

SUMMARY OF THE INVENTION

The present invention provides an image forming apparatus which is capable of properly updating firmware, and a control method therefor.

Accordingly, a first aspect of the present invention provides an image forming apparatus, comprising a download unit configured to download update firmware, an expansion unit configured to expand the update firmware downloaded by the download unit, a storage unit configured to store the update firmware expanded by the expansion unit, a determination unit configured to determine whether the update firmware expanded by the expansion unit and stored in the storage unit has been tampered with, and an application unit configured to apply the update firmware stored in the storage unit to the image forming apparatus if the determination unit determines that the update firmware has not been tampered with.

Accordingly, a second aspect of the present invention provides a method for controlling an image forming apparatus, comprising a download step of downloading update firmware, an expansion step of expanding the update firmware downloaded in the download step, a storage step of storing the update firmware expanded in the expansion step, a determination step of determining whether the update firmware expanded in the expansion step and stored in the storage step has been tampered with, and an application step of applying the update firmware stored in the storage step to the image forming apparatus if it is determined in the determination step that the update firmware has not been tampered with.

According to the present invention, a hash value for the storage area immediately after the firmware is stored and a hash value for the storage area calculated again when the image forming apparatus is restarted or a hash value for the firmware stored in the storage area and a hash value for the firmware calculated again when the image forming apparatus is restarted are compared with each other, and it is determined whether or not they match. Accordingly, when they do not match, it is determined that the downloaded firmware or the temporarily expanded firmware has been tampered with, and firmware update is stopped. As a result, improper firmware is prevented from being applied to the image forming apparatus, and hence firmware is properly updated.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
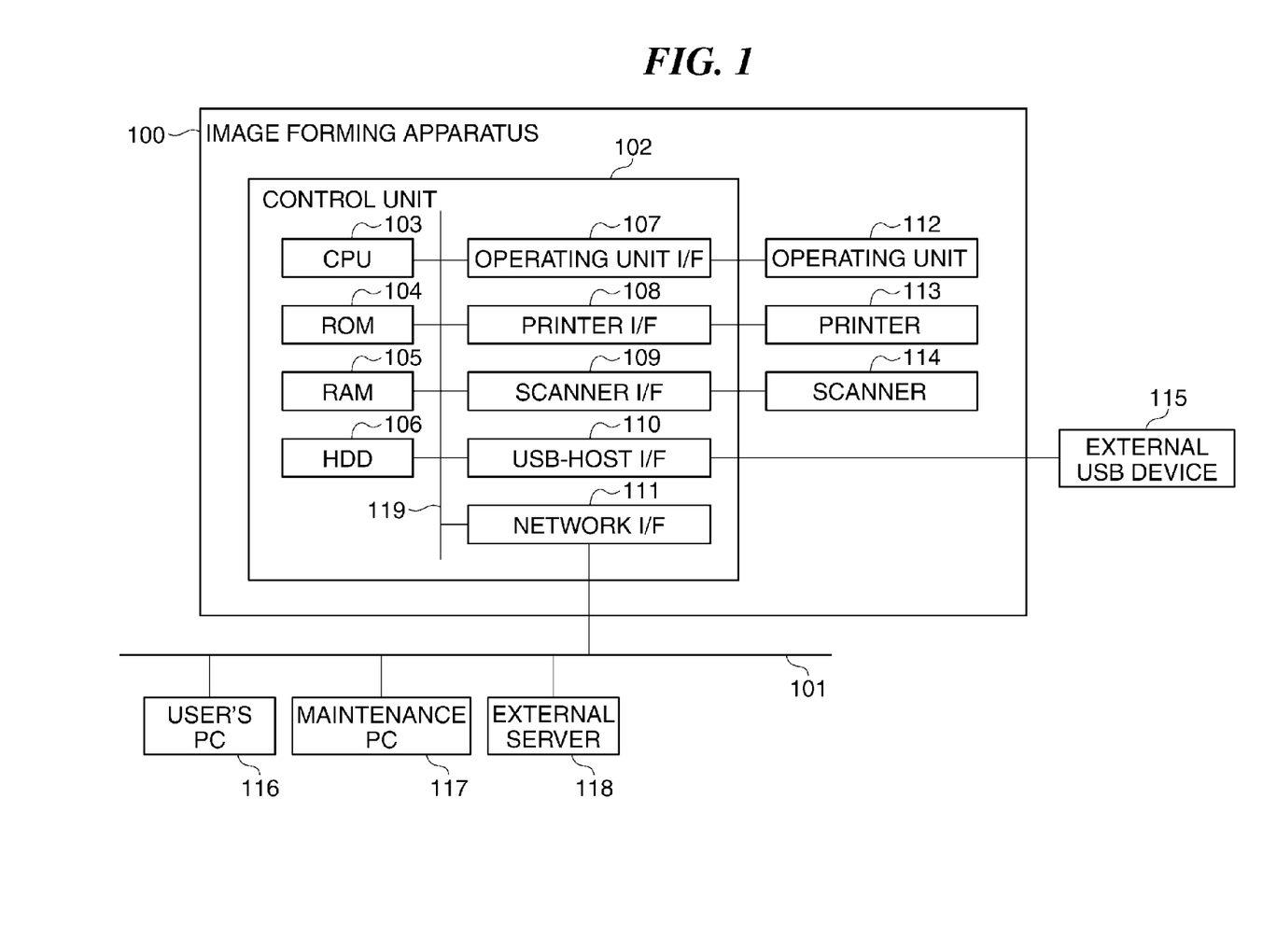
FIG. 1 is a block diagram schematically showing an arrangement of an image forming system having an image forming apparatus according to an embodiment of the present invention.

FIG. 1 is a block diagram schematically showing an arrangement of an image forming system having an image forming apparatus 100 according to an embodiment of the present invention.

The image forming system in FIG. 1 has the image forming apparatus 100, an external USB device 115, a user's PC 116, a maintenance PC 117, and an external server 118, and the image forming apparatus 100, the user's PC 116, the maintenance PC 117, and the external server 118 are connected to one another via a network 101. The external USB device 115 is connected to a USB-Host I/F 110, to be described later.

The image forming apparatus 100 has a control unit 102, an operating unit 112, a printer 113, and a scanner 114.

The control unit 102 has a CPU 103, a ROM 104, a RAM 105, an HDD 106, an operating unit I/F 107, a printer I/F 108, a scanner I/F 109, the USB-Host I/F 110, and a network I/F 111, which are connected to one another via an internal bus 119.

The operating unit I/F 107, the printer I/F 108, the scanner I/F 109, the USB-Host I/F 110, and the network I/F 111 are connected to the operating unit 112, the printer 113, the scanner 114, the external USB device 115, and the network 101, respectively.

The CPU 103 loads programs stored in the ROM 104 into the RAM 105 and executes them to control the entire image forming apparatus 100. The HDD 106 stores image data, user data, and so on.

The operating unit 112 is comprised of, for example, a liquid crystal touch panel. The printer 113 receives image data stored in the HDD 106 and prints the image data on sheets. The scanner 114 reads an image off an original using a line sensor comprised of a CCD (charge-coupled device) or the like, and convents the image into image data. The image data is then stored in the HDD 106 and printed on a sheet by the printer 113. The external USB device 115 is, for example, a USB memory or a USB keyboard.

The external server 118 stores update firmware and sends update firmware to the image forming apparatus 100 in response to a request from the mage forming apparatus 100.

Figure 2:
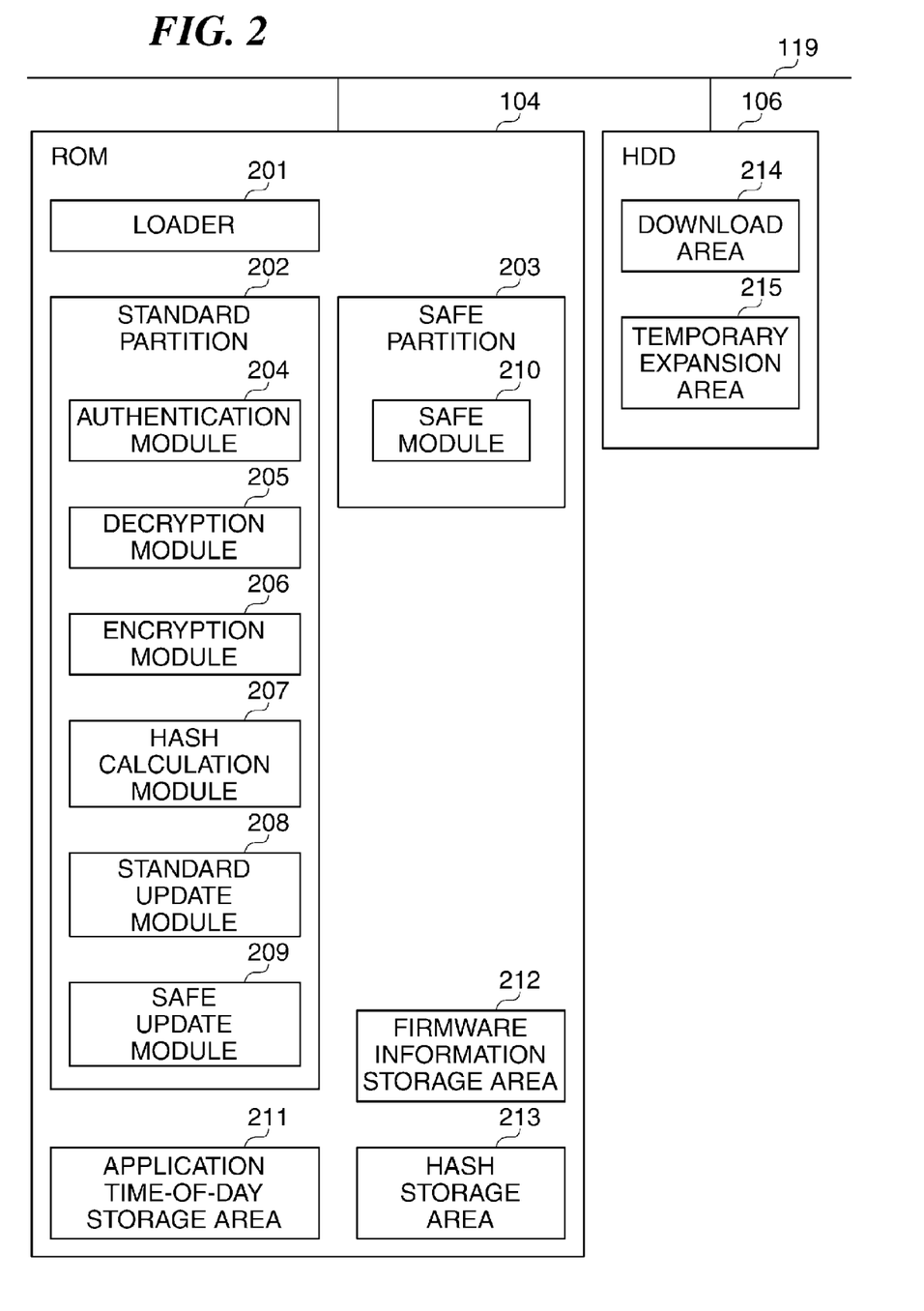
FIG. 2 is a diagram schematically showing an arrangement of firmware executed by the image forming apparatus in FIG. 1.

FIG. 2 is a diagram schematically showing an arrangement of firmware executed by the image forming apparatus 100 in FIG. 1.

The firmware in FIG. 2 is stored in the ROM 104 and the HDD 106 in FIG. 1.

Referring to FIG. 2, the ROM 104 has a loader 201, a standard partition 202, a safe partition 203, an application time-of-day information storage area 211, a firmware information storage area 212, and a hash storage area 213, and the HDD 106 has a download area 214 and a temporary expansion area 215.

The standard partition 202 has an authentication module 204, a decryption module 205, an encryption module 206, a hash calculation module 207, a standard update module 208, and a safe update module 209, and the safe partition 203 has a safe module 210. The modules of the standard partition 202 are started when a user performs printing or scanning or sends and receives facsimiles using the image forming apparatus 100.

The loader 201 determines a partition and a module to be started in accordance with a safe start instruction issued via the operating unit 112 when settings to start the image forming apparatus 100 are configured or maintenance of the image forming apparatus 100 is performed. It should be noted that a module included in the standard partition 202 is started unless there is a safe start instruction.

The authentication module 204 is used to perform user authentication when updating firmware. The decryption module 205 decrypts update firmware temporarily stored in the download area 214, to be described later, and the encryption module 206 encrypts each of the download area 214 and the temporary expansion area 215. The hash calculation module 207 calculates a hash value for the download area 214, to be described later, and a hash value for the temporary expansion area 215, and stores the hash values in the hash storage area 213.

The standard update module 208 temporarily expands update firmware, which is downloaded into the download area 214, to be described later, and decrypted by the decryption module 205, in the temporary expansion area 215 and applies the expanded update firmware to the modules which the standard partition 202 has. The safe update module 209 updates the safe module 210 which the safe partition 203 has. The safe module 210 updates the modules which the standard partition 202 has and controls functions during maintenance work.

The application time-of-day information storage area 211 stores an application time of day for firmware. The application time of day may be set in advance in the image forming apparatus 100 via the operating unit 112 or may be set from the external server 118 when update firmware is received. For example, the time of day at which update is performed on a regular basis may be set as the application time of day.

The firmware information storage area 212 stores, for example, authentication information on update firmware. The hash storage area 213 stores hash values for use in updating firmware. The download area 214 temporarily stores firmware obtained by downloading or the like, and the temporary expansion area 215 temporarily expands firmware temporarily stored in the download area 214. It should be noted that temporary expansion of firmware means that firmware to be applied is downloaded into the ROM 104 and then expanded once in the HDD 106.

Figure 3A:
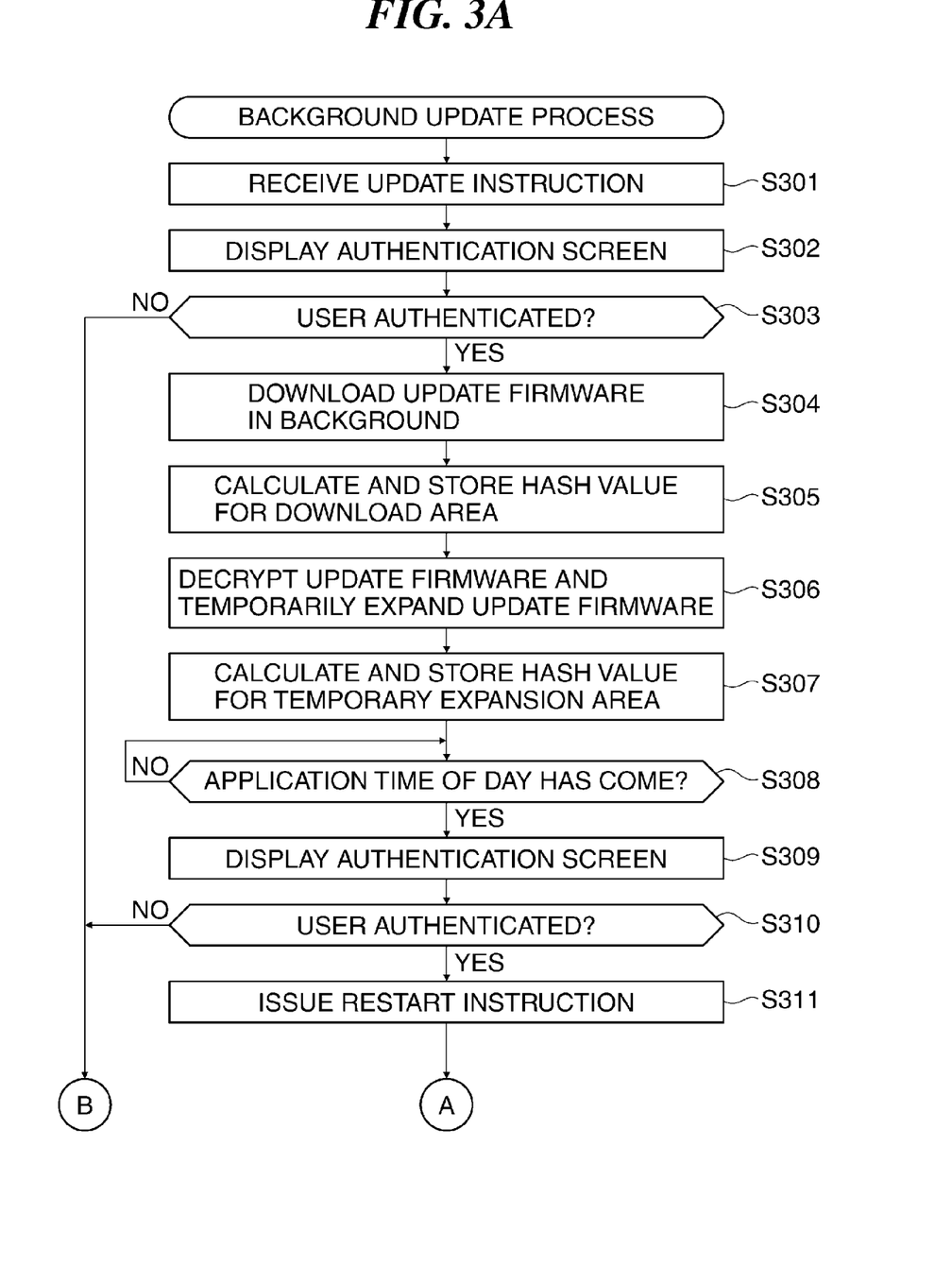
FIGS. 3A and 3B are flowcharts showing the procedure of a background update process carried out by the image forming apparatus in FIG. 1.
Figure 3B:
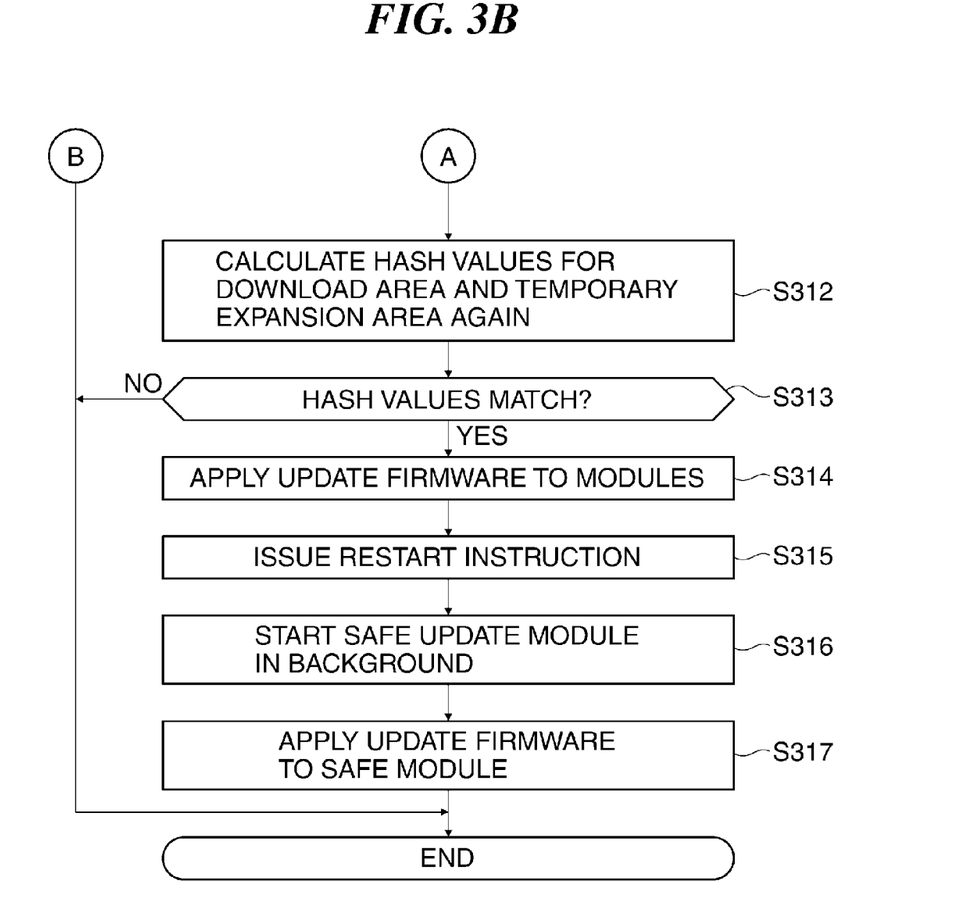

FIGS. 3A and 3B are flowcharts showing the procedure of a background update process carried out by the image forming apparatus 100 in FIG. 1.

The background update process in FIGS. 3A and 3B is carried out by the CPU 103 of the image forming apparatus 100.

Referring to FIGS. 3A and 3B, the CPU 103 receives an instruction to update firmware from the external server 118 in a normal startup state of the image forming apparatus 100 where the modules of the standard partition 202 have been started, and notifies the standard update module 208 of the instruction (step S301). After providing notification of the instruction, the CPU 103 stores information on update firmware in the firmware information storage area 212 using the standard update module 208. The CPU 103 then displays an authentication screen on the operating unit 112 (step S302) and determines whether or not user authentication for the image forming apparatus 100 has been performed (step S303). The steps S302 and S303 may be skipped when the image forming apparatus 100 does not require user authentication.

As a result of the determination in the step S303, when user authentication for the image forming apparatus 100 has been performed, the CPU 103 downloads update firmware of a new version for the modules stored in the standard partition 202 and the safe partition 203 from the external server 118 in the background and stores the downloaded firmware in the download area 214 (step S304). Further, the CPU 103 calculates a hash value for the download area 214 using the hash calculation module 207 and stores the calculated hash value in the hash storage area 213 (step S305). Then, the CPU 103 decrypts the update firmware, which has been downloaded into the download area 214, using the decryption module 205 in the background and temporarily expands the update firmware in the temporary expansion area 215 (step S306). Thereafter, the CPU 103 calculates a hash value for the temporary expansion area 215 at a time when the update firmware was temporarily expanded using the hash calculation module 207 and stores the calculated hash value in the hash storage area 213 (step S307).

Then, when the application time of day for firmware set in the application time-of-day storage area 211 has come (YES in step S308), the CPU 103 displays an authentication screen on the operating unit 112 to perform user authentication again (step S309) and determines whether or not user authentication has been performed (step S310). As with the steps S302 and S303, the steps S309 and S310 may be skipped when the image forming apparatus 100 does not require user authentication.

As a result of the determination in the step S303, when user authentication for the image forming apparatus 100 has been performed, the CPU 103 restarts the image forming apparatus 100 in a safe start state in which the module of the safe partition 203 is started (step S311).

Then, by means of the hash calculation module 207, the CPU 103 recalculates hash values for respective ones of the download area 214 and the temporary expansion area 215 after restart (step S312). The CPU 103 compares the hash value for the download area 214 calculated after restart with the hash value for the download area 214 stored in the step S305, and compares the hash value for the temporary expansion area 215 calculated after restart with the hash value for the temporary expansion area 215 stored in the step S307 to determine whether or not they match (step S313).

As a result of the determination in the step S313, when the hash values for the download area 214 match, and the hash values for the temporary expansion area 215 match, the CPU 103 applies the update firmware stored in the temporary expansion area 215 to the modules of the standard partition 202 (step S314).

The CPU 103 restarts the image forming apparatus 100 in a normal startup state with the modules to which the update firmware has been applied (step S315), and when the modules to which the update firmware has been applied are running, the CPU 103 starts the safe update module 209 in the background (step S316). The CPU 103 applies the update firmware expanded in the temporary expansion area 215 to the safe module 210 in the background by the safe update module 209 (step S317) and terminates the present process.

In the steps S315 to S317, since the safe module 210 has not been started when the modules of the standard partition 202 are running, update of the safe module 210 in the background is allowed to be performed irrespective of operation of the image forming apparatus 100.

On the other hand, as a result of the determination in the step S313, when the hash values for the download area 214 and the hash values for the temporary expansion area 215 do not match each other, data of firmware may have been tampered with in the download area 214 or the temporary expansion area 215, and thus the CPU 103 stops firmware update and terminates the present process.

Although in the background update process in FIGS. 3A and 3B, although an instruction to update firmware is received from the external server 118 in the step S301, and firmware is obtained from the external server 118 in the step S304, firmware may be obtained in other ways. Specifically, firmware may be obtained by connecting the USB memory 115 and the maintenance PC 117 in which firmware is stored to the image forming apparatus 100.

According to the background update process in FIGS. 3A and 3B, the hash value for the download area immediately after downloading of firmware (step S305) and the hash value for the download area recalculated when the image forming apparatus 100 is restarted (step S312) are compared with each other, and the hash value for the temporary expansion area immediately after downloaded firmware is temporarily expanded (step S307) and the hash value for the temporary expansion area recalculated when the image forming apparatus 100 is restarted (step S313) are compared with each other to determine whether or not they match. As a result, when they do not match, it is determined that downloaded firmware and temporarily expanded firmware have been tampered with, and firmware update is stopped to prevent improper firmware from being applied to the image forming apparatus 100.

Figure 4A:
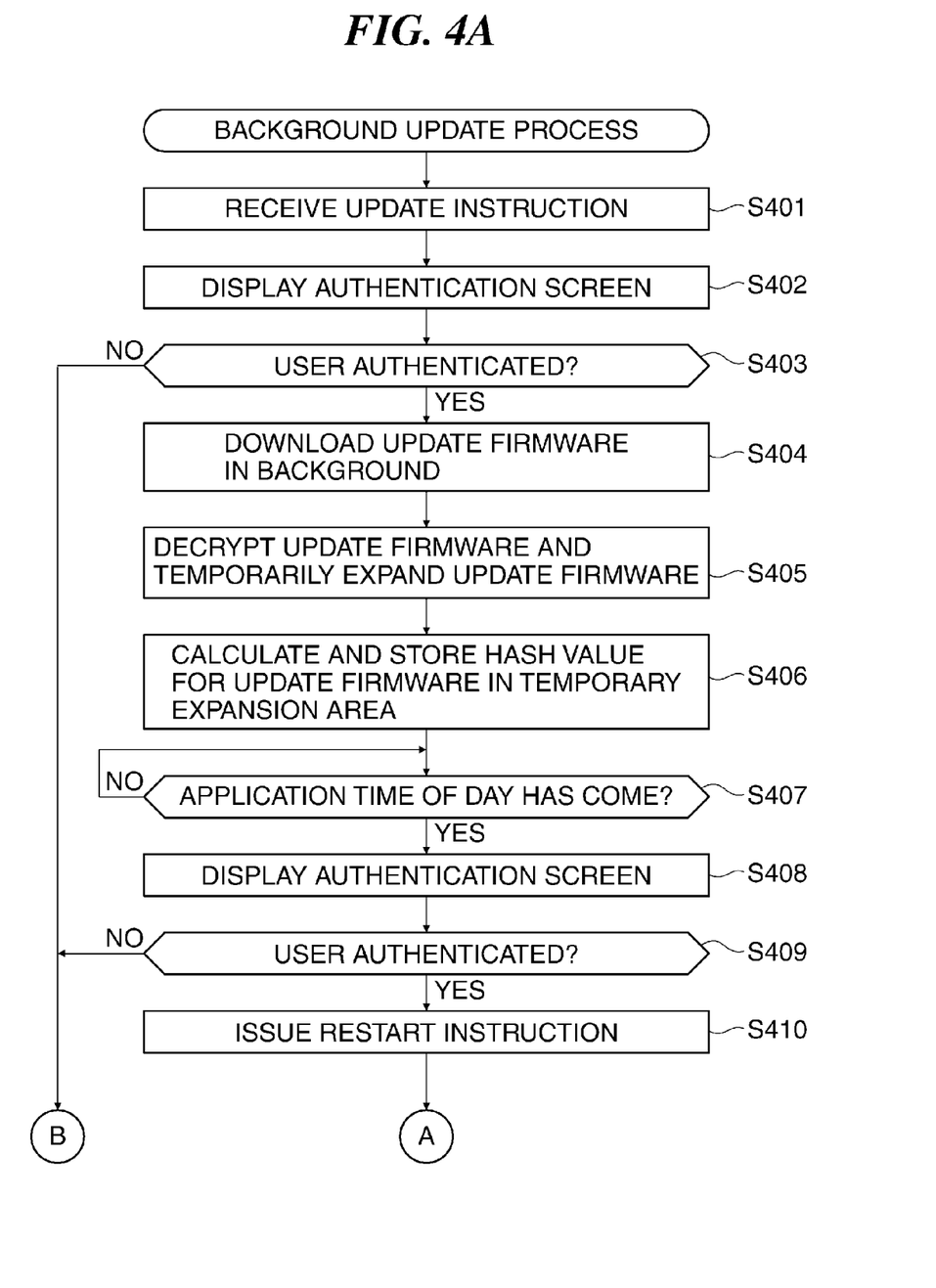
FIGS. 4A and 4B are flowcharts showing the procedure of a variation of the background update process in FIGS. 3A and 3B.
Figure 4B:
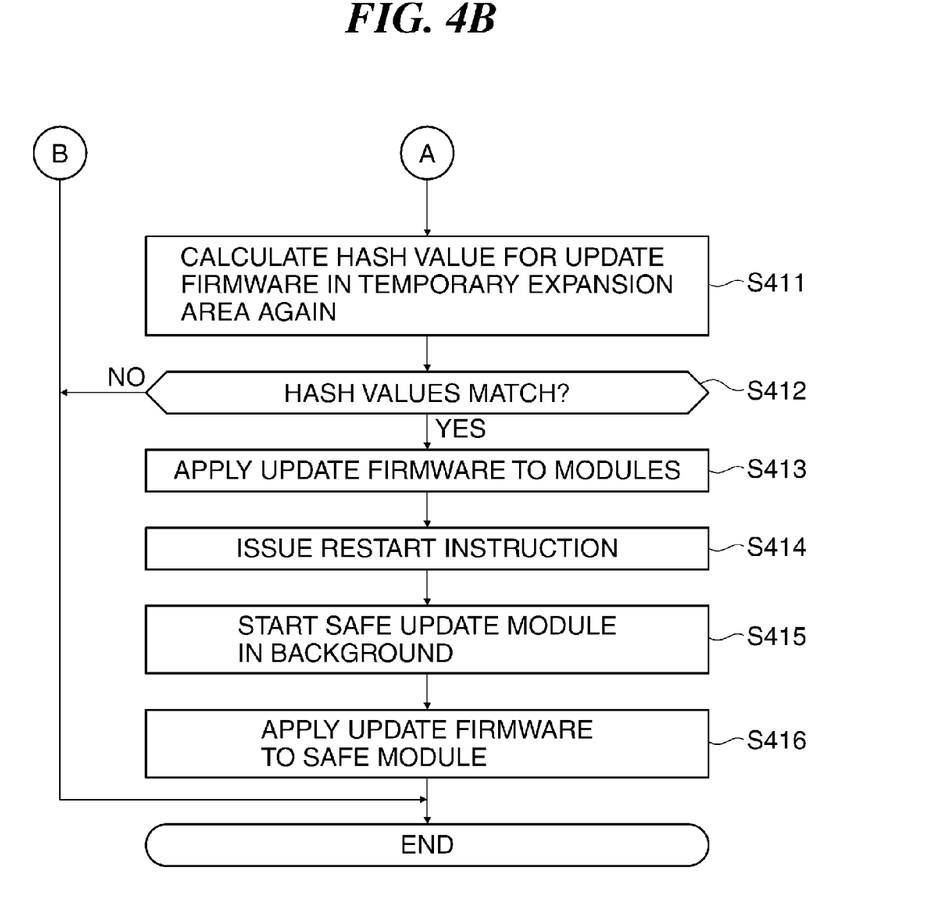

FIGS. 4A and 4B are flowcharts showing the procedure of a variation of the background update process in FIGS. 3A and 3B.

Steps S401 to S404, S405 to S410, and S413 to S416 in FIGS. 4A and 4B are the same as the steps S301 to S304, S306 to S311, and S314 to S317 in FIGS. 3A and 3B, respectively, and points differing from those in the process in FIGS. 3A and 3B will be described below.

Referring to FIGS. 4A and 4B, the CPU 103 downloads update firmware of a new version for the modules stored in the standard partition 202 and the safe partition 203 from the external server 118 in the background and stores the downloaded firmware in the download area 214 (step S404). Then, without calculating a hash value for the download area 214, the CPU 103 decrypts the update firmware, which has been downloaded into the download area 214, using the decryption module 205 in the background and temporarily stores the decrypted update firmware in the temporary expansion area 215 (step S405). The CPU 103 calculates a hash value for the temporarily-expanded update firmware using the hash calculation module 207 and stores the calculated hash value in the hash storage area 213 (step S406).

Then, after carrying out processes in the steps S407 to S410, the CPU 103 recalculates a hash value for the update firmware in the temporary expansion area 215 (step S411) and compares the hash value for the update firmware calculated in the step S406 and the hash value for the update firmware calculated in the step S411 to determine whether or not they match (step S412). The CPU 103 then carries out processes in the steps S413 and the subsequent steps and terminates the present process.

According to the background update process in FIGS. 4A and 4B, the CPU 103 compares a hash value for update firmware after temporary expansion (step S406) and a hash value for the update firmware after restart and determines whether or not they match (step S412). As a result, when they do not match, it is determined that the temporarily-expanded firmware has been tampered with, and the tampered update firmware is individually identified, so that application of improper firmware is swiftly prevented.

Moreover, in the background update process in FIGS. 4A and 4B, a hash value for the download area 214 is not calculated as compared to the background update process in FIGS. 3A and 3B, the burden on the image forming apparatus 100 is reduced.

Figure 5A:
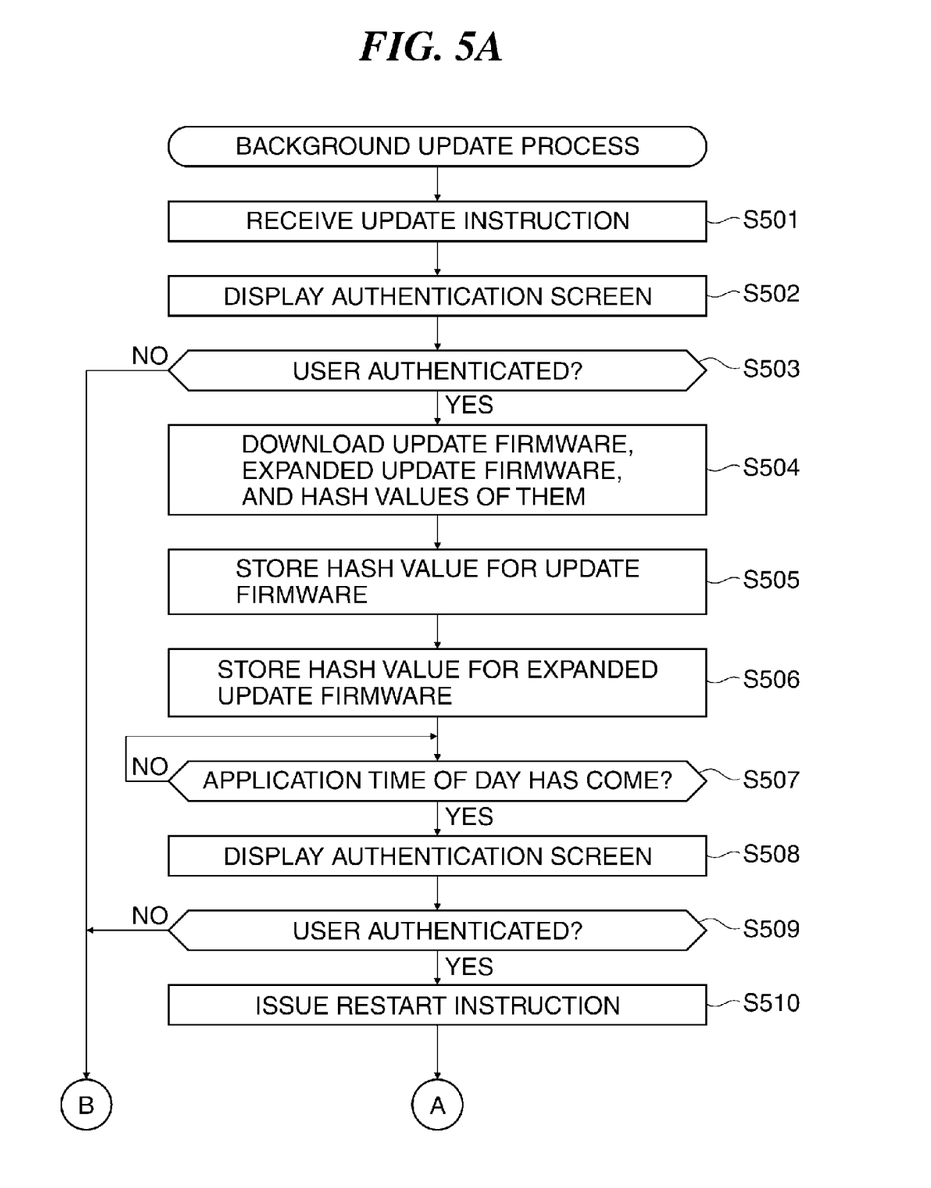
FIGS. 5A and 5B are flowcharts showing the procedure of another variation of the background update process in FIGS. 3A and 3B.
Figure 5B:
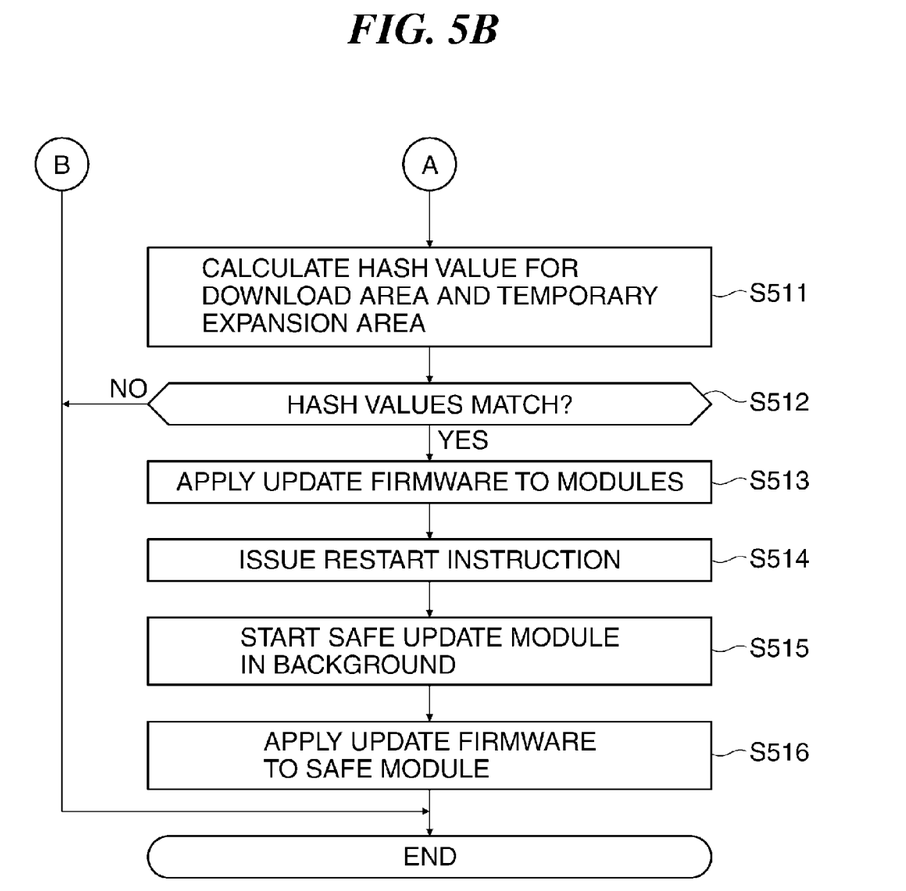

FIGS. 5A and 5B are flowcharts showing the procedure of another variation of the background update process in FIGS. 3A and 3B.

Steps S501 to S503 and S507 to S516 in FIGS. 5A and 5B are the same as the steps S301 to S303 and S308 to S317 in FIGS. 3A and 3B, respectively, and hence points differing from those in the process in FIGS. 3A and 3B will be described below.

Referring to FIGS. 5A and 5B, the CPU 103 determines whether or not the user of the image forming apparatus 100 has been authenticated (step S303). As a result of the determination in the step S503, when the user of the image forming apparatus 100 has been authenticated, update firmware, a hash value for the update firmware, and decrypted and expanded update firmware, and a hash value for the expanded update firmware are downloaded (step S504).

The update firmware and the expanded update firmware are stored in the download area 214 and the temporary expansion area 215, respectively. The hash values for the respective ones of the update firmware and the expanded update firmware are stored in the hash storage area 213 (steps S505 and S506). The stored hash values for the update firmware and the stored hash value for the expanded update firmware are consider to correspond to a hash value for the download area 214 and a hash value for the temporary expansion area 215, respectively. The CPU 103 then carries out processes in the steps S507 and the subsequent steps and terminates the present process.

According to the background update process in FIGS. 5A and 5B, update firmware, a hash value for the update firmware, and decrypted and expanded update firmware, and a hash value for the expanded update firmware are downloaded (step S504). This eliminates the need to calculate a hash value for the downloaded update firmware and a hash value for the expanded update firmware, and hence the burden on the image forming apparatus 100 is reduced.

Figure 6A:
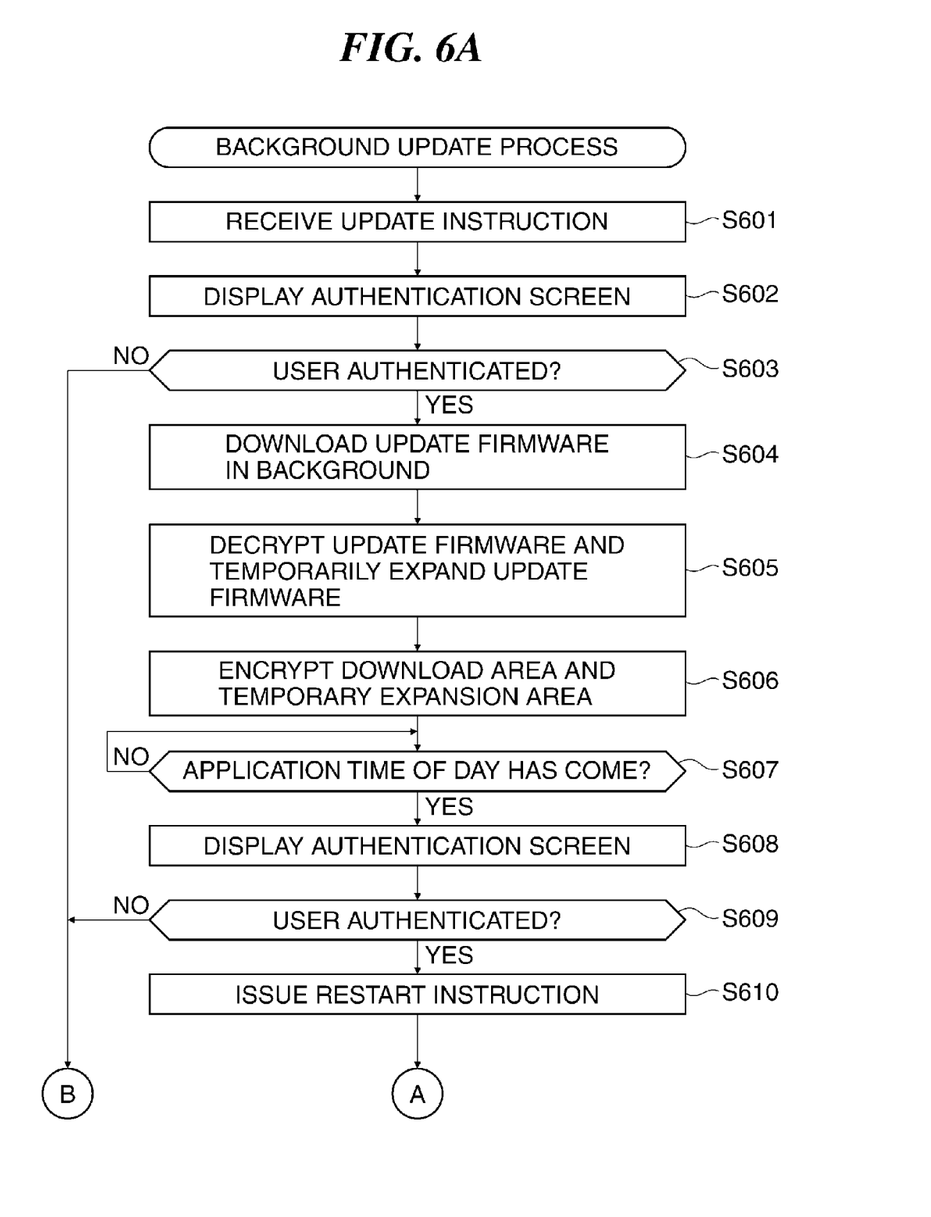
FIGS. 6A and 6B are flowcharts showing the procedure of still another variation of the background update process in FIGS. 3A and 3B.
Figure 6B:
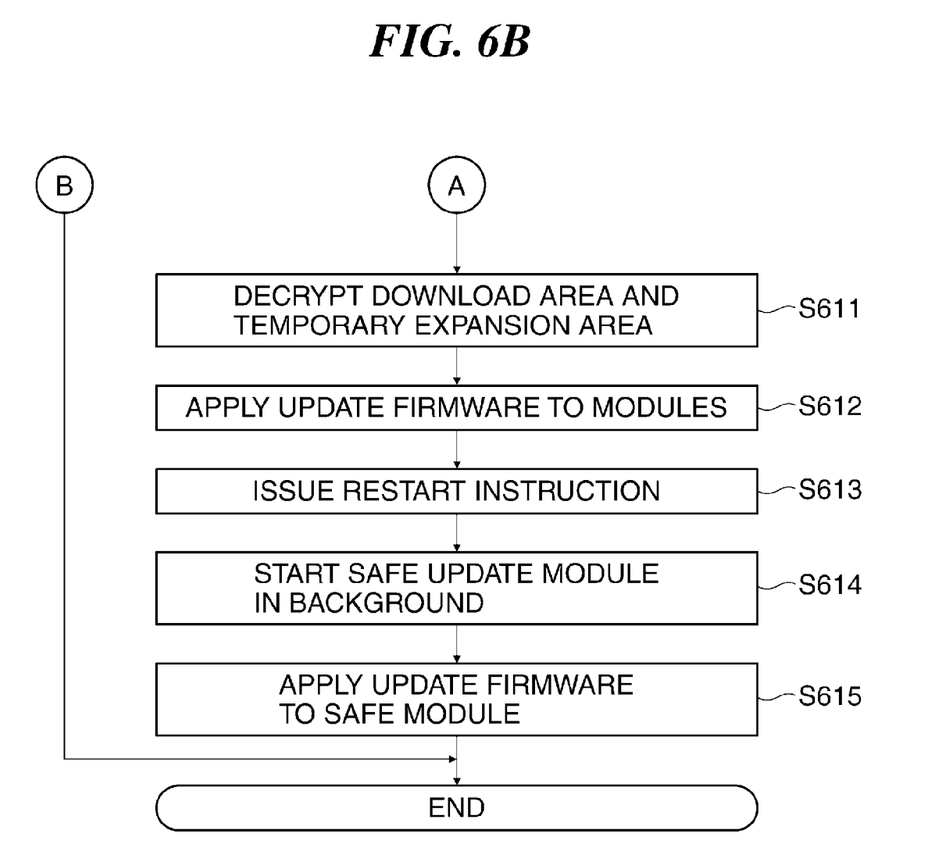

FIGS. 6A and 6B are flowcharts showing the procedure of still another variation of the background update process in FIGS. 3A and 3B.

Steps S601 to S604, S607 to S610, and S612 to S615 are the same as the steps S301 to S304, S308 to S311, and S314 to S317 in FIGS. 3A and 3B, respectively, and hence points differing from those in the process in FIGS. 3A and 3B will be described below.

Referring to FIGS. 6A and 6B, the CPU 103 downloads update firmware into the download area 214 from the external server 118 (step S604) and decrypts the update firmware using the decryption module 205 and temporarily expands the decrypted update firmware in the temporary expansion area 215 (step S605).

The CPU 103 then encrypts each of the download area 214 and the temporary expansion area 215 using the encryption module 206 (step S606) and carries out processes in steps S607 to S610.

The CPU 103 then decrypts the download area 214 and the temporary expansion area 215, which have been encrypted during a restart process, using the decryption module 205 (step S611). After that, the CPU 103 carries out processes in step S612 and subsequent steps and terminates the present process.

According to the background update process in FIGS. 6A and 6B, the CPU 103 decrypts update firmware downloaded into the download area 214 and temporarily expands the decrypted update firmware in the temporary storage area 215 and encrypts each of the download area 214 and the temporary expansion area 215 using the encryption module 206 (step S604 to S606). As a result, tampering itself of the downloaded update firmware and the temporarily-expanded update firmware is prevented. Moreover, since tampering is prevented without calculating hash values (steps S604 to S606), the burden on the image forming apparatus 100 is reduced as compared to a case where tampering is detected based on hash values.

Although in the embodiment of the present invention described above, hash values are used as indexes (unique information) for ascertaining that update firmware has not been tampered with, the indexes should not be limited to hash values but may be checksums or histories of access to the download area 214 and the temporary expansion area 215 in which update firmware is stored as long as whether or not update firmware has been tampered with can be ascertained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003218, filed Jan. 10, 2014, which is hereby incorporated by reference herein in its entirety.

What is claimed is:

1. An image forming apparatus, comprising:
a memory; and
a processor connected to the memory and configured to execute instructions that, when executed, cause the image forming apparatus to:
download compressed update firmware in background of operation of the image forming apparatus;
expand the downloaded compressed update firmware to generate update firmware modules;
store the expanded update firmware modules;
generate first verification information in response to the downloaded compressed update firmware being expanded to the expanded update firmware modules, and generate second verification information after the first verification information is generated and before the stored expanded update firmware modules are applied at an application time when the stored expanded update firmware modules are to be applied,
wherein the first verification information includes first hash information corresponding to storage areas where the expanded update firmware modules are stored, and the second verification information includes second hash information corresponding to the storage areas where the expanded update firmware modules are stored;
determine whether the stored expanded update firmware modules have been tampered with by verifying the generated first and second verification information based at least on a comparison between the calculated first hash information and the calculated second hash information; and
apply the stored expanded update firmware modules to the image forming apparatus if it is determined that the stored expanded update firmware modules have not been tampered with.

2. The image forming apparatus according to claim 1, wherein the downloaded compressed update firmware is encrypted.

3. The image forming apparatus according to claim 2, wherein the instructions further cause the image forming apparatus to:
   decrypt the downloaded compressed update firmware.

4. The image forming apparatus according to claim 1, wherein the stored expanded update firmware modules are applied to each of modules of the image forming apparatus.

5. A method of controlling an image forming apparatus, comprising:
   downloading compressed update firmware in background of operation of the image forming apparatus;
   expanding the downloaded compressed update firmware to generate update firmware modules;
   storing the expanded update firmware modules;
   generating first verification information in response to the downloaded compressed update firmware being expanded to the expanded update firmware modules, and generating second verification information after the first verification information is generated and before the stored expanded update firmware modules are applied at an application time when the stored expanded update firmware modules are to be applied, wherein the first verification information includes first hash information corresponding to storage areas where the expanded update firmware modules are stored, and the second verification information includes second hash information corresponding to the storage areas where the expanded update firmware modules are stored;
   determining whether the stored expanded update firmware modules have been tampered with by verifying the generated first and second verification information based at least on a comparison between the calculated first hash information and the calculated second hash information; and
   applying the stored expanded update firmware modules to the image forming apparatus if it is determined that the stored expanded update firmware modules have not been tampered with.

* * * * *